United States Patent
Willaford

Patent Number: 5,427,210
Date of Patent: Jun. 27, 1995

[54] WHEEL CHOCK FOR AIRCRAFT

[76] Inventor: Kenneth Willaford, 226 Ligustrum Dr., Plant City, Fla. 33565

[21] Appl. No.: 212,270

[22] Filed: Mar. 14, 1994

[51] Int. Cl.⁶ .............................................. B60T 3/00
[52] U.S. Cl. .................................................. 188/32
[58] Field of Search ................ 188/2 R, 32, 36; 410/30

[56] References Cited

U.S. PATENT DOCUMENTS

| | | | |
|---|---|---|---|
| 3,687,238 | 8/1972 | Carpenter | 188/32 |
| 4,711,325 | 12/1987 | Mountz | 188/32 |
| 5,104,170 | 4/1992 | Rich | 188/32 |

*Primary Examiner*—Mark T. Le
*Assistant Examiner*—Kevin D. Rutherford
*Attorney, Agent, or Firm*—Dominik, Stein, Saccocio, Reese & Colitz

[57] ABSTRACT

A wheel chock for aircraft comprising a first inverted U-shaped channel member which includes a horizontal upper surface and side surfaces extending downwardly therefrom to form vertical side edges. A first side panel is secured to one side edge of the first channel member and extends horizontally in a first direction with at least one locking hole extending therethrough. An aperture extends through each side surface of the first channel member in axial alignment about a horizontal axis. Both apertures are of a common predetermined diameter. A second U-shaped channel member includes a horizontal upper surface and side surfaces extending downwardly therefrom to form vertical side edges. A second side panel is secured to one side edge of the second channel member and extends horizontally in a second direction opposite from the first direction with at least one locking hole extending therethrough adapted to be positioned in alignment with at least one of the holes of the first side panel. A cylindrical rod extends horizontally in the second direction from adjacent to the end of the second channel member remote from the second side plate and is slidingly positionable within the apertures of the first channel member to an extent determined by the alignment of locking holes of the first and second side plates. A chain is secured to the first channel member adjacent to the apertures. The chain has a free end adapted to be positioned in alignment with the aligned holes of the first and second side plates.

4 Claims, 5 Drawing Sheets

WHEEL CHOCK FOR AIRCRAFT

BACKGROUND OF THE INVENTION

1. Field of the Invention

This invention relates to a wheel chock for aircraft and, more particularly, to securing an aircraft or other device with wheels through a chock adapted to secure a wheel around four sides thereof and from above.

2. Description of the Background Art

Presently, wheel chocks are used in the aircraft and other field to secure a wheel of a device to preclude unauthorized movement of the wheel and the aircraft or other device constructed with such wheel. Wheel chocks have two primary purposes. The first purpose is to prevent the aircraft from rolling due to wind or other aircraft taxiing by. The second purpose is security. Wheel chocks are designed with a locking mechanism which will secure the aircraft or other device and eliminate the possibility of theft. In addition, wheel chocks should be assembled on an aircraft nose wheel in a matter of seconds and should not be removed nor the aircraft moved until the chock is removed.

Known chocks are insufficient to attain the desired purposes and objectives. This is evidenced by the continuing technical efforts to improve chocks to overcome inherent problems of chocks having conventional and knows designs. Illustrative of the continuing technical efforts to improve chocks are a large number of prior patents. By way of example, U.S. Pat. No. 3,581,846 to Janus discloses a pair of blocks shaped as chocks to fit under the forward and rearward portions of a vehicle wheel and are joined together by a tie bar having one end secured to one blocks and having its other end slidingly received in ears projecting from a locking plate secured to the other blocks. A locking pin bearing a cam can be turned to force the cam against the bar. The pin handle is in the form of a loop and an eye is secured in the block adjacent the handle so that the pin may be secured in locked position by a padlock through handle and eye. Each block also has another projecting eye and a chain passed through the latter eyes and around the wheel can be locked by the padlock to prevent theft of the vehicle.

U.S. Pat. No. 3,687,238 to Carpenter discloses locking wheel chocks for an automotive vehicle wheel consisting of a pair of wedges adapted to be disposed respectively for and aft of said wheel, in engagement with the ground surface and confronting the periphery of the wheel, a connector joining said wedges and adapted to extend alongside said wheel, a mechanism for shortening said connector whereby said wedges are driven tightly between said wheel periphery and said road surface, and a key-operated locking device for securing said connector releasably at any desired degree of extension, and for securing said chock device to said wheel.

U.S. Pat. No. 3,845,844 to Woerner discloses a wheel chock adapted to be paired with another substantially identical chock to form a wheel chock assembly for use between the tandem wheels of a vehicle. A rigid arm having a flat sidewall generally in a central plane of the chock extends from an angular sidewall of the chock. When the chocks are positioned between tandem wheels, the arms are pivotally connected and set in a raised position. Downward pressure against the arms move the chocks out laterally into engagement with the wheels and the ground and prevent the wheels from rotating. Means are provided to distribute the force away from the center of the chock. Means are also provided to serve as a step for foot pressure in depressing the arms to lock the tandem wheels and as a handle to raise the arms. Other features of the invention are disclosed in the specification.

U.S. Pat. No. 4,804,070 to Bohler discloses an improved vehicle locking wheel chock comprising a pair of wedge shaped chocks having flat bottom ground contacting surfaces each rigidly affixed to respective end portions of a spacing bar with the chock bottom surfaces in a coplanar relationship and the oblique wedge surfaces of the respective chocks in a facing relationship spaced apart a distance that the space between the respective chock oblique wedge surfaces defines the region occupied by the vehicle wheel. Each chock rotatably supports a lockable retaining mechanism comprising a support rod extending transversely of the chock with a pair of elongated retaining arms rigidly affixed to opposite ends of the rod to extend transversely of the rod axis and spaced apart a distance exceeding the width of a vehicle wheel. Each rod is pivotally supported by a chock for rotation about the longitudinal axis of the rod between an open position in which both retaining arms lie outside the face of the wheel region space defined between the oblique wedge surfaces of the respective chocks and a closed position in which both retaining arms lie across the face of the wheel region space defined between the oblique wedge surfaces of the respective chocks. The outer end of the retaining arms of both retaining mechanisms positioned on the same side of the pair of chocks being configured for being mutually coupled together when the retaining arms are in the closed position.

All of the known designs for chocks are deficient in one aspect or another.

Accordingly, it is an object of the present invention to provide an improvement which overcomes the aforementioned inadequacies of the prior art devices and provides an improvement which is a significant contribution to the advancement of the wheel chocks art.

Another object of the present invention is to secure wheels of vehicles against unauthorized or unintended movement.

Another object of the present invention is to deter the theft of wheeled devices.

Another object of the present invention is to contact a wheel on four adjacent sides and over the top in an effort to more positively preclude movement of the wheel and its vehicle while the chock is in place.

Another object of the present invention is to allow easy assembly and disassembly with regard to the wheel to be secured.

It is a further object of the present invention to provide a wheel chock for aircraft comprising a first inverted U-shaped channel member including a horizontal upper surface and side surfaces extending downwardly therefrom to form vertical side edges. A first side panel is secured to one side edge of the first channel member and extends horizontally in a first direction. The first side panel has at least one locking hole extending therethrough. An aperture extends through each side surface of the first channel member. The apertures are in axial alignment about a horizontal axis. Both apertures are of a common predetermined diameter. The present invention further includes a second U-shaped channel member including a horizontal upper surface and side surfaces extending downwardly therefrom to form vertical side edges. A second side panel is secured to one side edge of the second channel member and extends horizontally in a second direction opposite from the first direction. The second side panel has at least one locking hole extending therethrough adapted to be positioned in alignment with at least one of the holes of the first side panel. The present invention further includes a cylindrical rod extending horizontally in the second direction from adjacent to the end of the second channel member remote from the second side plate and slidingly positionable within the apertures of the first channel member to an extent determined by the alignment of locking holes of the first and second side plates. The device further includes a chain secured to the first channel member adjacent to the apertures. The chain has a free end adapted to be positioned in alignment with the aligned holes of the first and second side plates.

The foregoing has outlined some of the pertinent objects of the invention. These objects should be construed to merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a new and improved wheel chock for aircraft comprising a first inverted U-shaped channel member positionable on the ground at a location adjacent to the tread of a wheel of an aircraft to be secured. Such first channel member includes a horizontal upper surface and side surfaces extending downwardly therefrom to form vertical side edges. Also included is a first side panel secured to one side edge of the first channel member and extending horizontally in a first direction. The first side panel has a plurality of spaced locking holes extending therethrough. Further included is an aperture extending through each side surface of the first channel member. The apertures is in axial alignment about a horizontal axis. Both apertures are of a common predetermined diameter. Also included is a second inverted U-shaped channel member positionable on the ground at a location adjacent to the tread of a wheel of an aircraft to be secured with such wheel being between the first and second channel members. Such second channel member includes a horizontal upper surface and side surfaces extending downwardly therefrom to form vertical side edges. A second side panel is secured to one side edge of the second channel member and extends horizontally in a second direction opposite from the first direction. The second side panel has a plurality of spaced locking holes extending therethrough adapted to be positioned in alignment with at least one of the holes of the first side panel. Further included is a cylindrical rod extending horizontally in the second direction from adjacent to the end of the second channel member remote from the second side plate and slidingly positionable within the apertures of the first channel member to an extent determined by the alignment of locking holes of the first and second side plates. The device further includes a semi-circular recess extending upwardly from the side surface of the first channel member facing the second channel member and adapted to receive the upper portion of the cylindrical rod adjacent to the side surface of the second channel member when the channel members are nested together for storage. A chain is secured to the first channel member adjacent to the apertures. The chain has a free end adapted to be positioned in alignment with the aligned holes of the first and second side plates with the central extent of the chain positionable over the axle of an aircraft wheel. The device further includes a pad lock positionable through the aligned holes of the first and second side plates and a chain link adjacent to the free end of the chain for securement therewith whereby a wheel of an aircraft may be positioned between the first and second channel members forwardly and rearwardly with the side plates on one side of the wheel and the cylindrical rod on the other side of the wheel.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
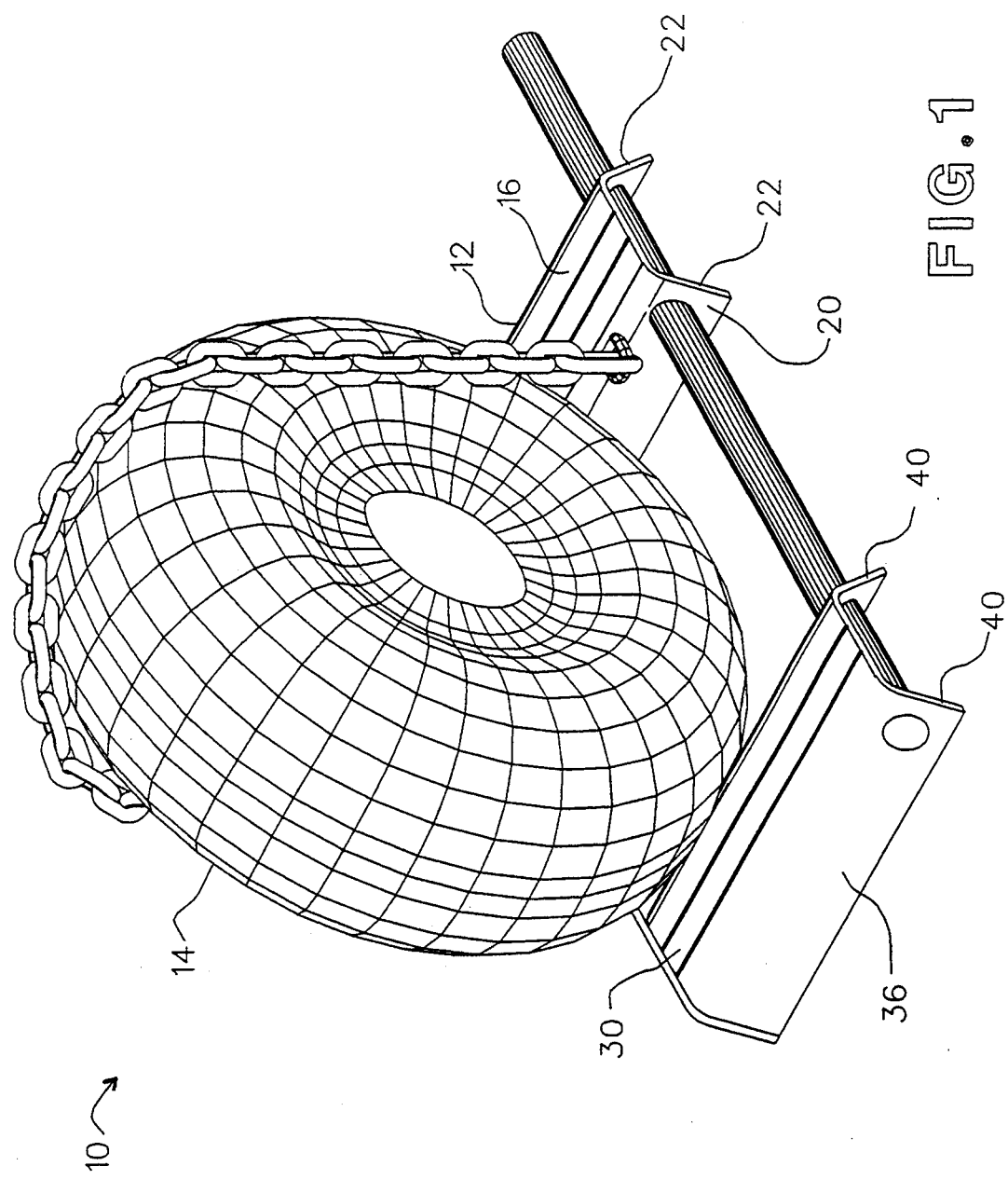
FIG. 1 is a perspective illustration of the preferred embodiment of the new and improved wheel chock constructed in accordance with the principles of the present invention.
Figure 2:
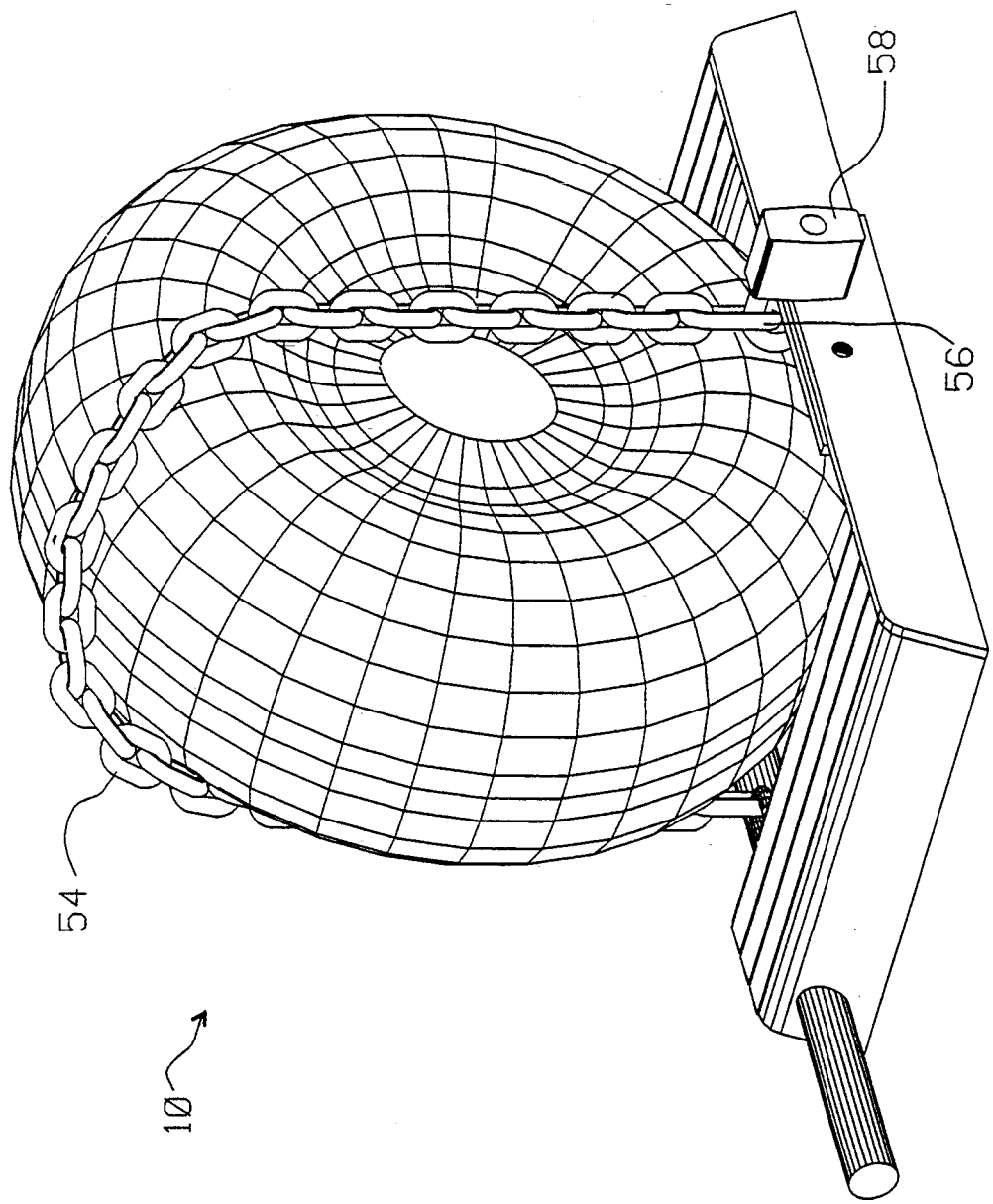
FIG. 2 is a perspective view of the device shown in FIG. 1 but taken from the opposite side thereof.
Figure 3:
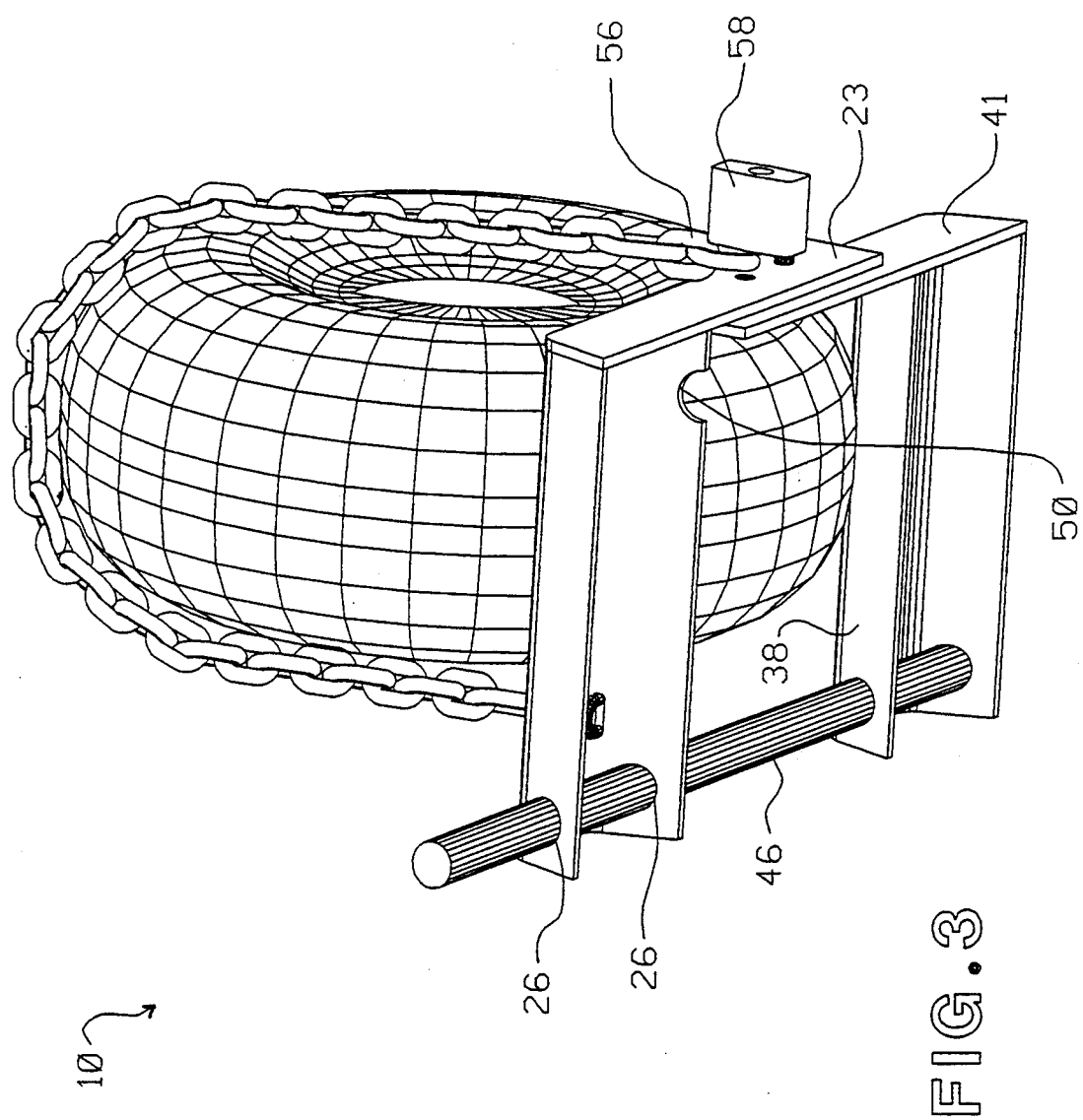
FIG. 3 is a bottom perspective view of the device shown in the prior Figures.
Figure 4:
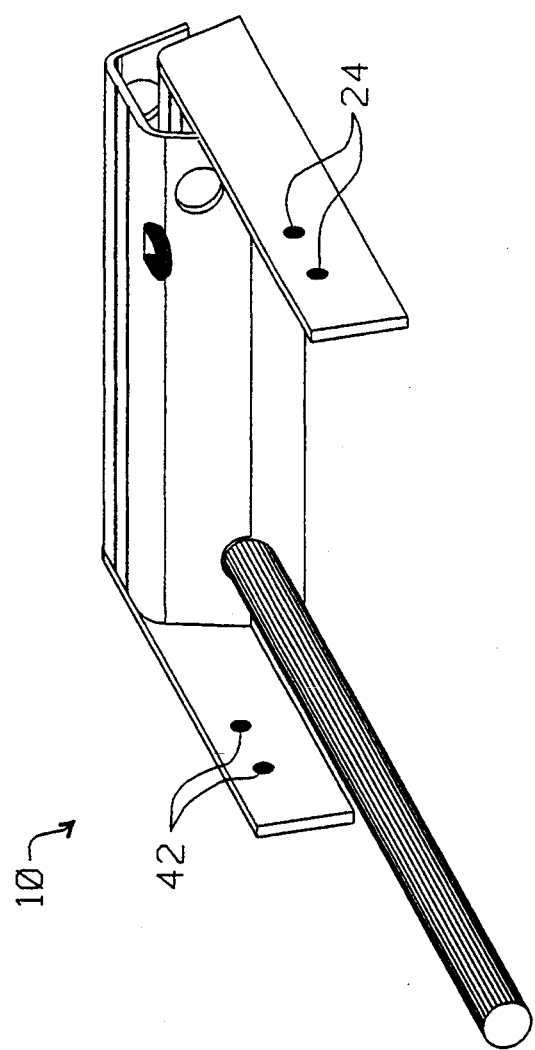
FIG. 4 is a perspective illustration of one of the members which is used in constituting the apparatus of the prior Figures.
Figure 5:
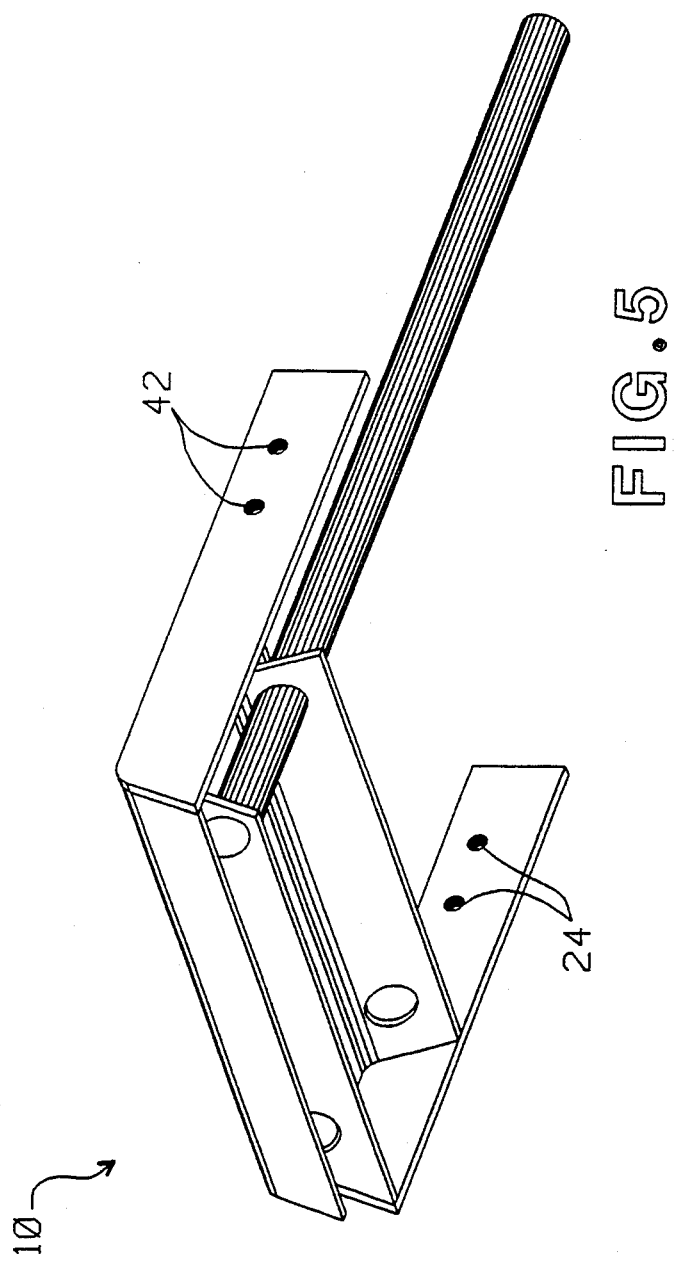
FIG. 5 is a bottom perspective view of the component shown in FIG. 4.

The present invention, the new and improved wheel chocks for aircraft is comprised of a plurality of component elements. Each component element is specifically configured and correlated with respect to each other so as to attain the desired objective. In their broadest context, such components include a first U-shaped channel member with a first side panel, a second U-shaped channel member with a second side panel, a cylindrical rod, a chain, and a pad lock.

More specifically, the present invention is an apparatus 10 which has a first inverted U-shaped channel member 12. Such member is positionable on the ground at a location adjacent to the thread of a wheel 14 of an aircraft to be secured. The first channel member includes an upper horizontal surface 16 and also includes angled side surfaces 18 and 20 extending downwardly therefrom to form vertical side edges 22. A first side panel 23 is secured to one side edge of the first channel member. Such side panel extends horizontally in a first direction. The first side panel also has a plurality of spaced locking holes 24 extending therethrough. In addition, an aperture 26 extends through each side surface of the first channel member. The apertures are in axial alignment about a horizontal axis. Both such apertures are of a common predetermined diameter.

Next provided is a second inverted U-shaped channel member 30. Such second channel member is positionable on the ground at a location adjacent thread of the wheel of the aircraft to be secured. The wheel is located between the first and second channel members.

The second channel member includes a horizontal upper surface 34. It also includes angled side surfaces 36 and 38 which extend downwardly therefrom to form vertical side edges 40. A second side panel 41 is secured to one side edge of the second channel member. It extends horizontally in a second direction opposite from the first direction. The second side panel has a plurality of spaced locking holes 42 extending therethrough. Such holes are adapted to be positioned in alignment with at least one of the holes of the first side panel discussed above.

Proper positioning between the two channel members is effected through a cylindrical rod 46. Such rod extends horizontally in a second direction from adjacent to the end of the second channel member remote from the second side panel. It is adapted to be positioned in a sliding relationship within the apertures of the first channel member. The extent of positioning is determined by the alignment of the locking holes of the first and second side panels.

An additional feature of the channel members is a semi-circular recess 50. Such recess extends upwardly from the side surface of the first channel member facing the second channel member. It is adapted to receive the upper portion of the cylindrical rod adjacent to the side surface of the second channel member. This mating relationship occurs when the channel members are nested together for storage.

The actual coupling of the wheel to the chock is effected through a chain 54. The chain is secured to the first channel member adjacent to the apertures. The chain has a free end 56 adapted to be positioned with a link in alignment with the aligned holes of the first and second side panels. The central extent of the chain is thus positionable over the wheel and axle and the aircraft wheel. One portion of the chain is in front of the axle while the other portion of the chain is behind the axle with the center of the chain over the wheel. While the preferred embodiment shown the wheel chock in relation to an aircraft wheel, such chocks could be used to secure any wheeled vehicle including cars, trucks, lawn mowers, etc.

The last component of the device of the present invention is a pad-lock 58. The pad-lock is adapted to be positioned through the aligned holes of the first and second panels and a link of the chain adjacent to the free end of the chain in alignment with such aligned holes. This is for securement therewith. In this manner, a wheel of an aircraft may be positioned between the first and second channel members, forwardly and rearwardly, with the side plates on one side of the wheel and the cylindrical rod on the other side of the wheel. This arrangement provides for securement of the wheel with respect to the wheel chock on four sides adjacent the bottom. It also allows for a chain to extend over the top of the wheel for a secure 5-point coupling between the wheel and the chock for a greater securement then was previously possible.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A wheel chock for aircraft comprising, in combination:

a first inverted U-shaped channel member positionable on the ground at a location adjacent to the tread of a wheel of an aircraft to be secured, such first channel member including a horizontal upper surface and side surfaces extending downwardly therefrom to form vertical side edges, a first side panel secured to one side edge of the first channel member and extending horizontally in a first direction, the first side panel having a plurality of spaced locking holes extending therethrough, an aperture extending through each side surface of the first channel member, the apertures being in axial alignment about a horizontal axis, both apertures being of a common predetermined diameter;

a second inverted U-shaped channel member positionable on the ground at a location adjacent to the tread of a wheel of an aircraft to be secured with such wheel being between the first and second channel members, such second channel member including a horizontal upper surface and side surfaces extending downwardly therefrom to form vertical side edges, a second side panel secured to one side edge of the second channel member and extending horizontally in a second direction opposite from the first direction, the second side panel having a plurality of spaced locking holes extending therethrough adapted to be positioned in alignment with at least one of the holes of the first side panel;

a cylindrical rod extending horizontally in the second direction from adjacent to the end of the second channel member remote from the second side panel and slidingly positionable within the apertures of the first channel member to an extent determined by the alignment of locking holes of the first and second side panels;

a semi-circular recess extending upwardly from the side surface of the first channel member facing the second channel member, the recess being on the side of the first channel member remote from its apertures and adapted to receive the upper portion of the cylindrical rod adjacent to the side surface of the second channel member when the channel members are nested together for storage;

a chain with links having a first end secured to the first channel member adjacent to the apertures and on the side of the chocks remote from the side panels and locking holes, the chain having a free second end adapted to be positioned in alignment with the aligned holes of the first and second side panels with the central extent of the chain positionable over the axle of an aircraft wheel; and a pad lock positionable through aligned holes of the first and second side panels and a link of the chain adjacent to the free second end of the chain for securement therewith whereby a wheel of an aircraft may be positioned between the first and second channel members forwardly and rearwardly with the side panels on one side of the wheel and the cylindrical rod on the other side of the wheel.

2. A wheel chock for a wheeled vehicle comprising:

a first inverted U-shaped channel member including a horizontal upper surface and side surfaces extending downwardly therefrom to form vertical side edges, a first side panel secured to one side edge of the first channel member and extending horizontally in a first direction, the first side panel having at least one locking hole extending therethrough, an aperture extending through each side surface of the first channel member, the apertures being in axial alignment about a horizontal axis, both apertures being of a common predetermined diameter;

a second U-shaped channel member including a horizontal upper surface and side surfaces extending downwardly therefrom to form vertical side edges, a second side panel secured to one side edge of the second channel member and extending horizontally in a second direction opposite from the first direction, the second side panel having at least one locking hole extending therethrough adapted to be positioned in alignment with at least one of the holes of the first side panel;

a cylindrical rod extending horizontally in the second direction from adjacent to the end of the second channel member remote from the second side panel and slidingly positionable within the apertures of the first channel member to an extent determined by the alignment of locking holes of the first and second side panels; and a chain with links having a first end secured to the first channel member adjacent to the apertures and on the side of the chocks remote from the side panels and locking holes, the chain having a free second end adapted to be positioned in alignment with the aligned holes of the first and second side panels.

3. The wheel chock as set forth in claim 2 and further including:

a semi-circular recess extending upwardly from the side surface of the first channel member facing the second channel member, the recess being on the side of the first channel member remote from its apertures and adapted to receive the upper portion of the cylindrical rod adjacent to the side surface of the second channel member when the channel members are nested together for storage.

4. The wheel chock as set forth in claim 2 and further including:

a pad lock positionable through aligned apertures of the first and second side panels and a link of the chain adjacent to the free second end of the chain for securement therewith whereby a wheel of an aircraft may be positioned between the first and second channel members forwardly and rearwardly with the side panels on one side of the wheel and the cylindrical rod on the other side of the wheel.

* * * * *